US012670771B2

(12) United States Patent
Park et al.

(10) Patent No.: US 12,670,771 B2
(45) Date of Patent: Jun. 30, 2026

(54) METHOD OF STACKING MEDIA IN MEDIA STORAGE UNIT

(71) Applicant: HYOSUNG TNS INC., Seoul (KR)

(72) Inventors: Jong Seong Park, Gyeonggi-Do (KR); Tae Min Choi, Seoul (KR); Byung Hyun Jo, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 38 days.

(21) Appl. No.: 18/714,668

(22) PCT Filed: Nov. 10, 2022

(86) PCT No.: PCT/KR2022/017647
§ 371 (c)(1),
(2) Date: May 30, 2024

(87) PCT Pub. No.: WO2023/128258
PCT Pub. Date: Jul. 6, 2023

(65) Prior Publication Data
US 2025/0042688 A1 Feb. 6, 2025

(30) Foreign Application Priority Data
Dec. 27, 2021 (KR) ........................ 10-2021-0188203

(51) Int. Cl.
*G07D 11/17* (2019.01)
*G07F 19/00* (2006.01)

(52) U.S. Cl.
CPC ........... *G07F 19/202* (2013.01); *G07D 11/17* (2019.01); *G07D 2211/00* (2013.01)

(58) Field of Classification Search
CPC ......... G07D 11/16; G07D 11/17; G07D 11/22
See application file for complete search history.

(56) References Cited

U.S. PATENT DOCUMENTS

| | | | | |
|---|---|---|---|---|
| 4,703,162 | A | 10/1987 | Holland-Letz et al. | |
| 5,422,467 | A | 6/1995 | Graef et al. | |
| 6,398,107 | B1 | 6/2002 | Neri | |
| 7,029,008 | B2 * | 4/2006 | Nishida ................. | B65H 31/36 271/223 |

(Continued)

FOREIGN PATENT DOCUMENTS

| | | | |
|---|---|---|---|
| JP | S61281386 A | | 12/1986 |
| JP | H10129915 A | * | 5/1998 |

(Continued)

OTHER PUBLICATIONS

Russian OA in English Translation, cited in Appln. No. RU2024115265 dated Nov. 29, 2024.

(Continued)

*Primary Examiner* — Patrick Cicchino
(74) *Attorney, Agent, or Firm* — BACON & THOMAS, PLLC

(57) ABSTRACT

Provided is a method of stacking media in a media storage unit, which includes: receiving information about a length of a medium entering a media storage unit; calculating a delay time of a stopper corresponding to the length of the medium; and applying a delay time of the stopper calculated for each medium entering the media storage unit to differentially control activation of the stopper for each medium.

5 Claims, 8 Drawing Sheets

(56) References Cited

U.S. PATENT DOCUMENTS

| | | | | | |
|---|---|---|---|---|---|
| 10,109,137 | B2 * | 10/2018 | Park | ....................... | G07D 11/17 |

FOREIGN PATENT DOCUMENTS

| | | | | | |
|---|---|---|---|---|---|
| JP | 3126656 | B2 | | 1/2001 | |
| JP | 3336210 | B2 | | 10/2002 | |
| KR | 20100080189 | A | | 7/2010 | |
| KR | 101628481 | B1 | | 6/2016 | |
| KR | 102008574 | B1 | * | 8/2019 | ............. G07D 11/16 |
| WO | WO2009110079 | A1 | | 9/2009 | |
| WO | WO2012/029399 | A1 | | 8/2012 | |

OTHER PUBLICATIONS

Extended European Search Report, dated Nov. 11, 2025, in European Appln. No. EP22916412.4.

India Office Action cited in corresponding India Appln. No. 202437046905.

* cited by examiner

[FIG. 1]
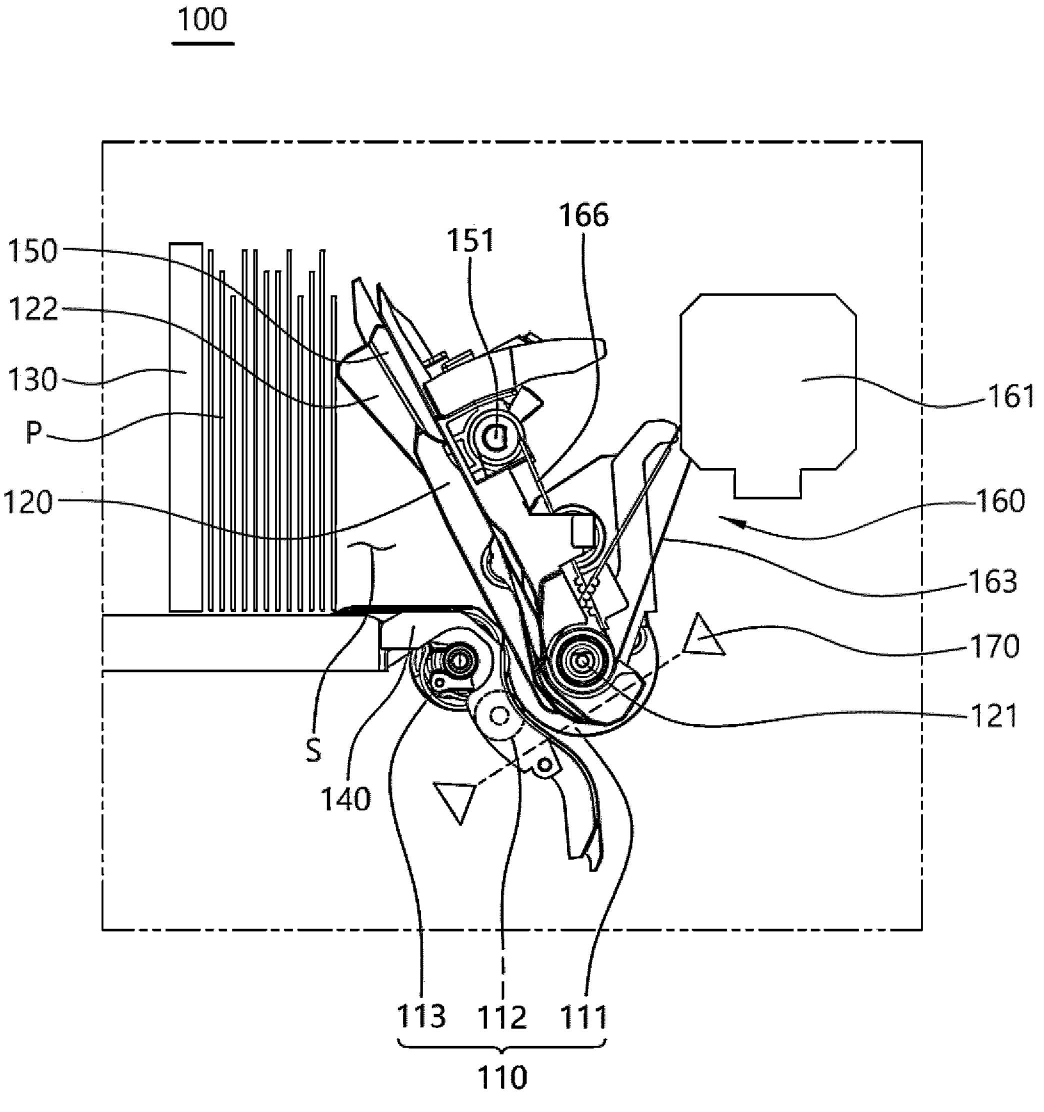

[FIG. 2]
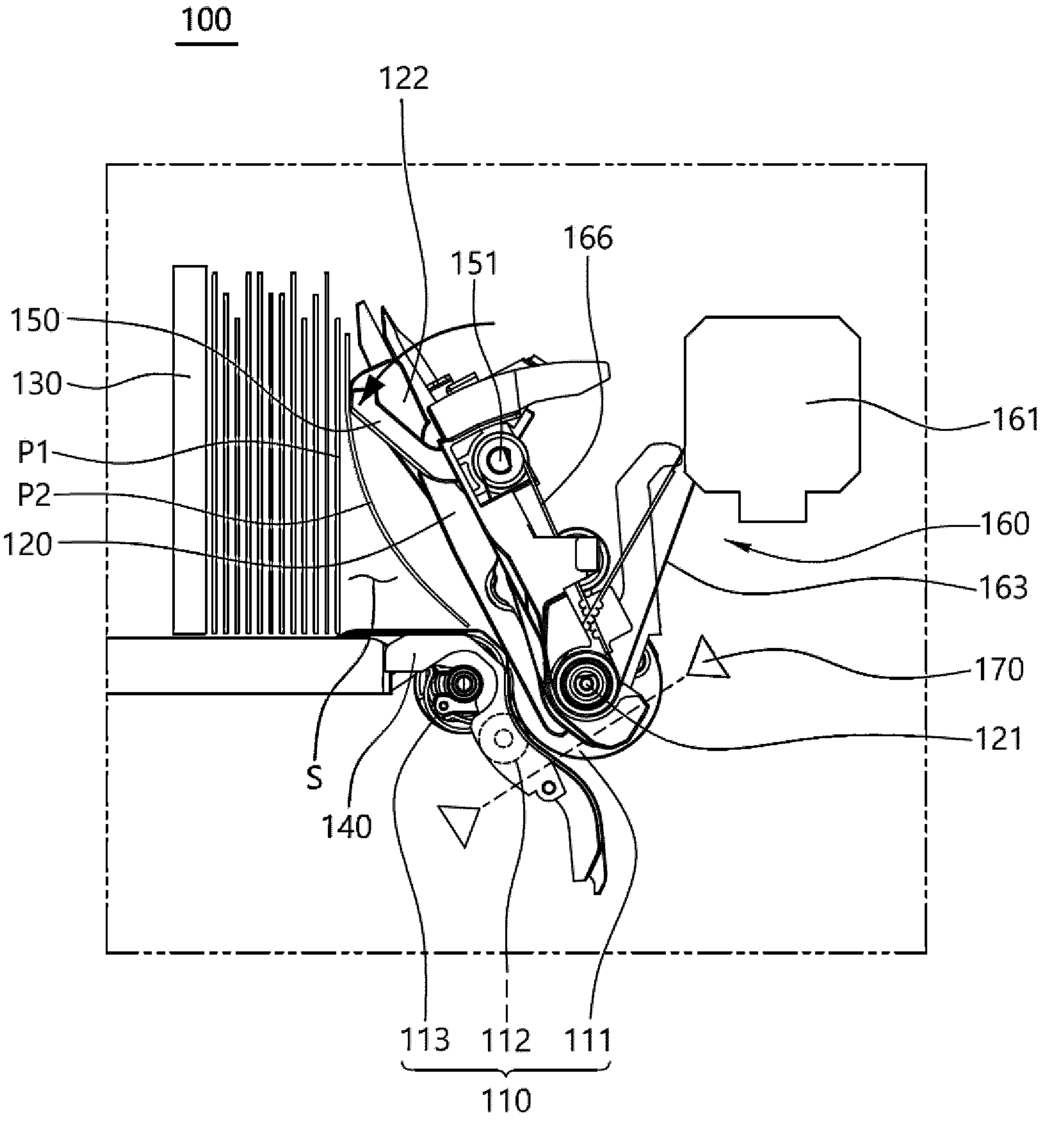

[FIG. 3]
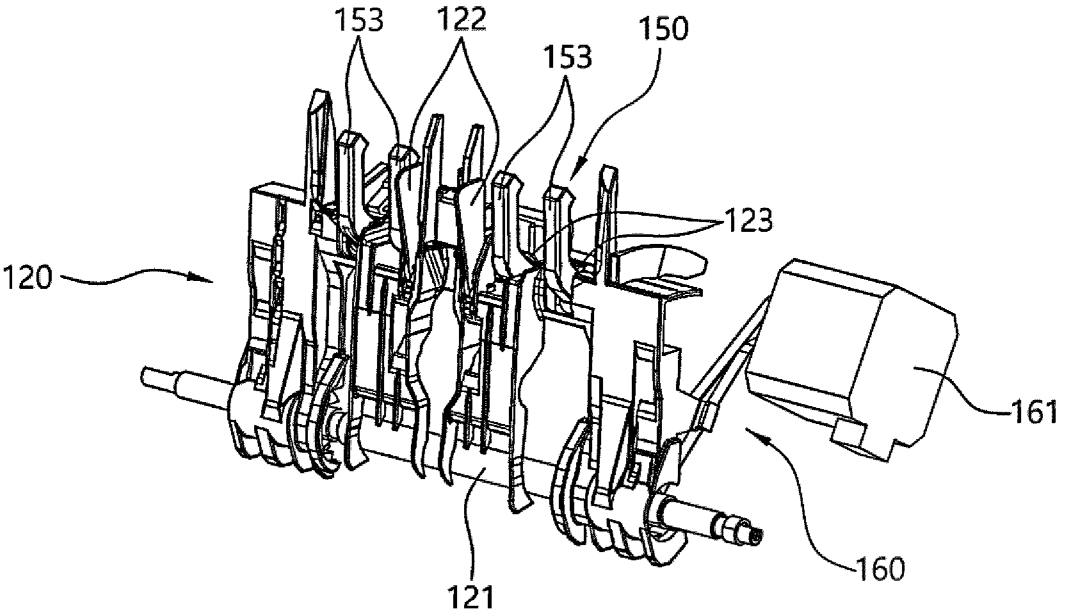
[FIG. 4]
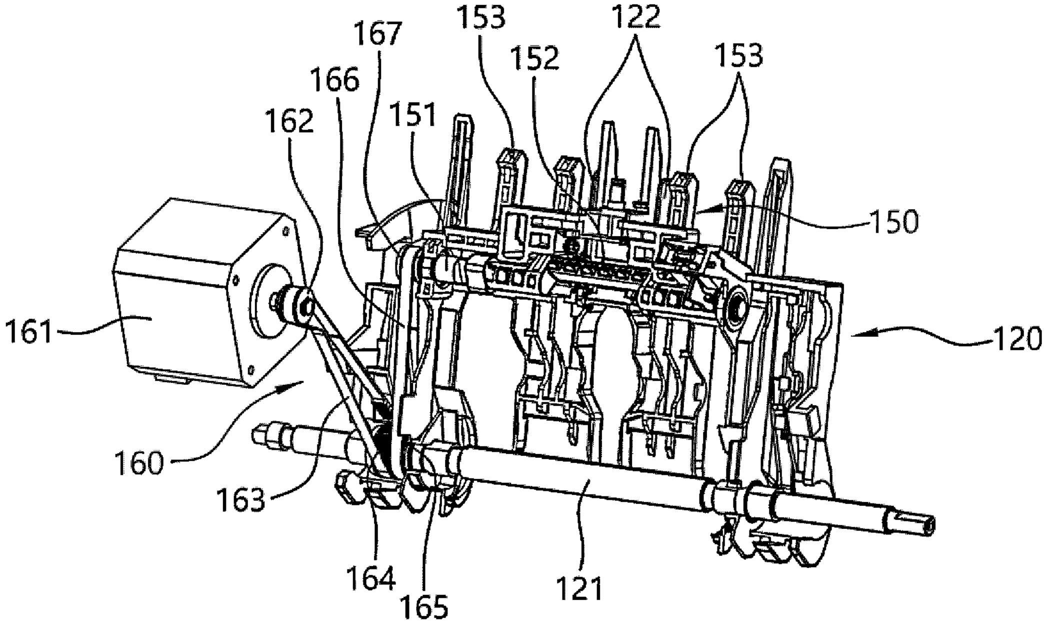

[FIG. 5]
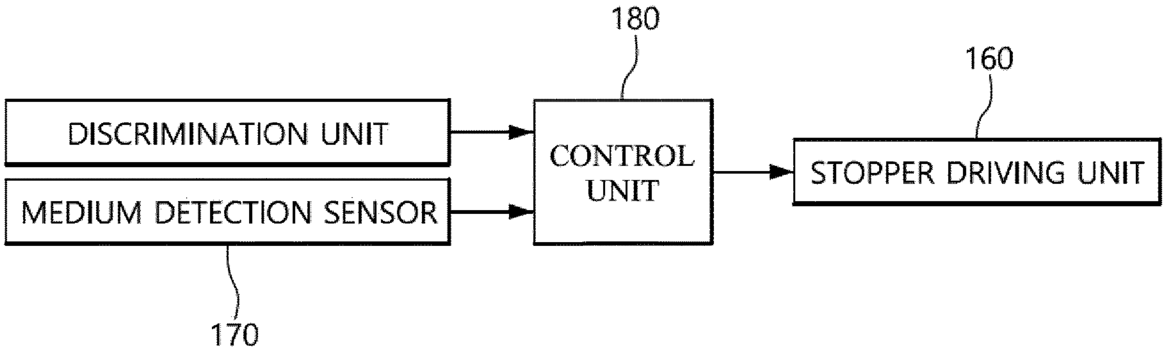
[FIG. 6]
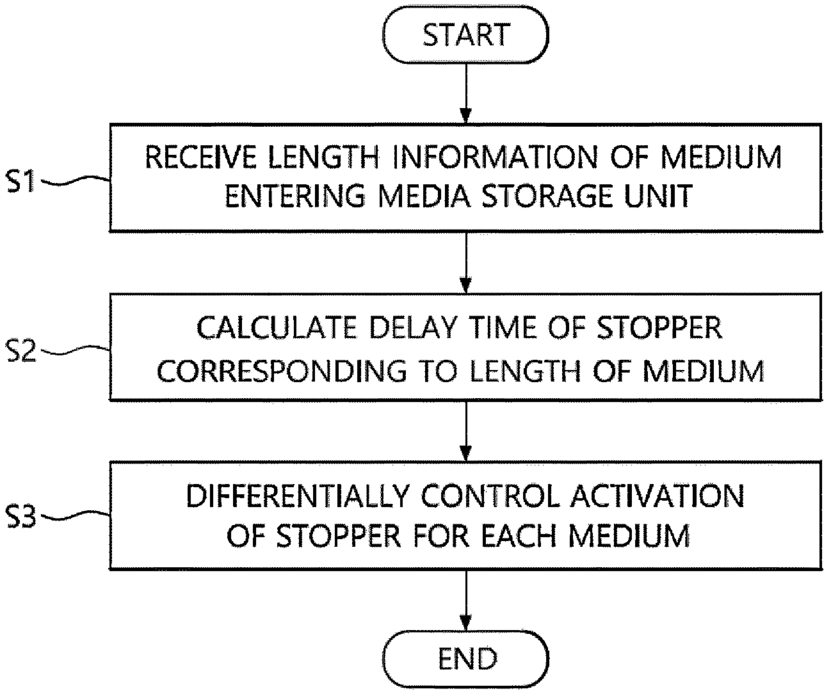

[FIG. 7]

TEN SHEETS/s (1,500mm/s)

| LONGITUDINAL SIZE OF MEDIUM(mm) | TIME TO MOVE IN ENGAGEMENT WITH F-G ROLLERS(ms) | MAXIMUM TIME FOR MEDIUM TO FLY AWAY(ms) | OPERATION TIME OF STOPPER(ms) | TIME FOR WHICH MOVEMENT IS DELAYED DUE TO FRICTION BETWEEN MEDIA(ms) | DELAY TIME(ms) |
|---|---|---|---|---|---|
| 62 | 13.9 | 5.7 | 12.5 | 2.0 | 9 |
| 63 | 13.9 | 5.8 | 12.5 | 2.0 | 9 |
| 64 | 13.9 | 5.9 | 12.5 | 2.0 | 9 |
| 65 | 13.9 | 6.1 | 12.5 | 2.0 | 9 |
| 66 | 13.9 | 6.2 | 12.5 | 2.0 | 10 |
| 67 | 13.9 | 6.3 | 12.5 | 2.0 | 10 |
| 68 | 13.9 | 6.5 | 12.5 | 2.0 | 10 |
| 69 | 13.9 | 6.7 | 12.5 | 2.0 | 10 |
| 70 | 13.9 | 6.8 | 12.5 | 2.0 | 10 |
| 71 | 13.9 | 7.0 | 12.5 | 2.0 | 10 |
| 72 | 13.9 | 7.2 | 12.5 | 2.0 | 11 |
| 73 | 13.9 | 7.4 | 12.5 | 2.0 | 11 |
| 74 | 13.9 | 7.6 | 12.5 | 2.0 | 11 |
| 75 | 13.9 | 7.8 | 12.5 | 2.0 | 11 |
| 76 | 13.9 | 8.1 | 12.5 | 2.0 | 11 |
| 77 | 13.9 | 8.3 | 12.5 | 2.0 | 12 |
| 78 | 13.9 | 8.6 | 12.5 | 2.0 | 12 |
| 79 | 13.9 | 8.9 | 12.5 | 2.0 | 12 |
| 80 | 13.9 | 9.2 | 12.5 | 2.0 | 13 |
| 81 | 13.9 | 9.5 | 12.5 | 2.0 | 13 |
| 82 | 13.9 | 9.9 | 12.5 | 2.0 | 13 |
| 83 | 13.9 | 10.2 | 12.5 | 2.0 | 14 |
| 84 | 13.9 | 10.6 | 12.5 | 2.0 | 14 |
| 85 | 13.9 | 11.1 | 12.5 | 2.0 | 14 |

TEN SHEETS/s (1,500mm/s)

| VELOCITY (SHEETS/s) | 68mm | 77mm |
|---|---|---|
| 10 | 3.2 | 2.5 |

a = -0.07778
b = 8.488889

VELOCITY AT WHICH MEDIUM FLIES = a X SIZE OF MEDIUM + b
= -0.07778 X SIZE OF MEDIUM + 8.488889

[FIG. 8]

EIGHT SHEETS/s (1,200mm/s)

| LONGITUDINAL SIZE OF MEDIUM(mm) | TIME TO MOVE IN ENGAGEMENT WITH F-G ROLLERS(ms) | MAXIMUM TIME FOR MEDIUM TO FLY AWAY(ms) | OPERATION TIME OF STOPPER(ms) | TIME FOR WHICH MOVEMENT IS DELAYED DUE TO FRICTION BETWEEN MEDIA(ms) | DELAY TIME(ms) |
|---|---|---|---|---|---|
| 62 | 17.3 | 7.1 | 12.5 | 2.0 | 14 |
| 63 | 17.3 | 7.2 | 12.5 | 2.0 | 14 |
| 64 | 17.3 | 7.4 | 12.5 | 2.0 | 14 |
| 65 | 17.3 | 7.6 | 12.5 | 2.0 | 14 |
| 66 | 17.3 | 7.7 | 12.5 | 2.0 | 15 |
| 67 | 17.3 | 7.9 | 12.5 | 2.0 | 15 |
| 68 | 17.3 | 8.1 | 12.5 | 2.0 | 15 |
| 69 | 17.3 | 8.3 | 12.5 | 2.0 | 15 |
| 70 | 17.3 | 8.5 | 12.5 | 2.0 | 15 |
| 71 | 17.3 | 8.8 | 12.5 | 2.0 | 16 |
| 72 | 17.3 | 9.0 | 12.5 | 2.0 | 16 |
| 73 | 17.3 | 9.2 | 12.5 | 2.0 | 16 |
| 74 | 17.3 | 9.5 | 12.5 | 2.0 | 16 |
| 75 | 17.3 | 9.8 | 12.5 | 2.0 | 17 |
| 76 | 17.3 | 10.1 | 12.5 | 2.0 | 17 |
| 77 | 17.3 | 10.4 | 12.5 | 2.0 | 17 |
| 78 | 17.3 | 10.7 | 12.5 | 2.0 | 18 |
| 79 | 17.3 | 11.1 | 12.5 | 2.0 | 18 |
| 80 | 17.3 | 11.5 | 12.5 | 2.0 | 18 |
| 81 | 17.3 | 11.9 | 12.5 | 2.0 | 19 |
| 82 | 17.3 | 12.3 | 12.5 | 2.0 | 19 |
| 83 | 17.3 | 12.8 | 12.5 | 2.0 | 20 |
| 84 | 17.3 | 13.3 | 12.5 | 2.0 | 20 |
| 85 | 17.3 | 13.8 | 12.5 | 2.0 | 21 |

EIGHT SHEETS/s (1,200mm/s)

| VELOCITY (SHEETS/s) | 68mm | 77mm |
|---|---|---|
| 8 | 2.56 | 2 |

a = -0.06222 b = 6.791111

VELOCITY AT WHICH MEDIUM FLIES = a X SIZE OF MEDIUM + b

= -0.06222 X SIZE OF MEDIUM + 6.791111

[FIG. 9]

SIX SHEETS/s (900mm/s)

| LONGITUDINAL SIZE OF MEDIUM(mm) | TIME TO MOVE IN ENGAGEMENT WITH F-G ROLLERS(ms) | MAXIMUM TIME FOR MEDIUM TO FLY AWAY(ms) | OPERATION TIME OF STOPPER(ms) | TIME FOR WHICH MOVEMENT IS DELAYED DUE TO FRICTION BETWEEN MEDIA(ms) | DELAY TIME(ms) |
|---|---|---|---|---|---|
| 62 | 23.1 | 9.5 | 12.5 | 2.0 | 22 |
| 63 | 23.1 | 9.7 | 12.5 | 2.0 | 22 |
| 64 | 23.1 | 9.9 | 12.5 | 2.0 | 22 |
| 65 | 23.1 | 10.1 | 12.5 | 2.0 | 23 |
| 66 | 23.1 | 10.3 | 12.5 | 2.0 | 23 |
| 67 | 23.1 | 10.6 | 12.5 | 2.0 | 23 |
| 68 | 23.1 | 10.8 | 12.5 | 2.0 | 23 |
| 69 | 23.1 | 11.1 | 12.5 | 2.0 | 24 |
| 70 | 23.1 | 11.4 | 12.5 | 2.0 | 24 |
| 71 | 23.1 | 11.7 | 12.5 | 2.0 | 24 |
| 72 | 23.1 | 12.0 | 12.5 | 2.0 | 25 |
| 73 | 23.1 | 12.3 | 12.5 | 2.0 | 25 |
| 74 | 23.1 | 12.7 | 12.5 | 2.0 | 25 |
| 75 | 23.1 | 13.1 | 12.5 | 2.0 | 26 |
| 76 | 23.1 | 13.5 | 12.5 | 2.0 | 26 |
| 77 | 23.1 | 13.9 | 12.5 | 2.0 | 26 |
| 78 | 23.1 | 14.3 | 12.5 | 2.0 | 27 |
| 79 | 23.1 | 14.8 | 12.5 | 2.0 | 27 |
| 80 | 23.1 | 15.3 | 12.5 | 2.0 | 28 |
| 81 | 23.1 | 15.8 | 12.5 | 2.0 | 28 |
| 82 | 23.1 | 16.4 | 12.5 | 2.0 | 29 |
| 83 | 23.1 | 17.1 | 12.5 | 2.0 | 30 |
| 84 | 23.1 | 17.7 | 12.5 | 2.0 | 30 |
| 85 | 23.1 | 18.5 | 12.5 | 2.0 | 31 |

SIX SHEETS/s (900mm/s)

| VELOCITY (SHEETS/s) | 68mm | 77mm |
|---|---|---|
| 6 | 1.92 | 1.5 |

a = -0.04667
b = 5.093333

VELOCITY AT WHICH MEDIUM FLIES = a X SIZE OF MEDIUM + b
= -0.04667 X SIZE OF MEDIUM + 5.093333

[FIG. 10]

FOUR SHEETS/s (600mm/s)

| LONGITUDINAL SIZE OF MEDIUM(mm) | TIME TO MOVE IN ENGAGEMENT WITH F-G ROLLERS(ms) | MAXIMUM TIME FOR MEDIUM TO FLY AWAY(ms) | OPERATION TIME OF STOPPER(ms) | TIME FOR WHICH MOVEMENT IS DELAYED DUE TO FRICTION BETWEEN MEDIA(ms) | DELAY TIME(ms) |
|---|---|---|---|---|---|
| 62 | 34.7 | 14.2 | 12.5 | 2.0 | 38 |
| 63 | 34.7 | 14.5 | 12.5 | 2.0 | 39 |
| 64 | 34.7 | 14.8 | 12.5 | 2.0 | 39 |
| 65 | 34.7 | 15.1 | 12.5 | 2.0 | 39 |
| 66 | 34.7 | 15.5 | 12.5 | 2.0 | 40 |
| 67 | 34.7 | 15.9 | 12.5 | 2.0 | 40 |
| 68 | 34.7 | 16.2 | 12.5 | 2.0 | 40 |
| 69 | 34.7 | 16.7 | 12.5 | 2.0 | 41 |
| 70 | 34.7 | 17.1 | 12.5 | 2.0 | 41 |
| 71 | 34.7 | 17.5 | 12.5 | 2.0 | 42 |
| 72 | 34.7 | 18.0 | 12.5 | 2.0 | 42 |
| 73 | 34.7 | 18.5 | 12.5 | 2.0 | 43 |
| 74 | 34.7 | 19.0 | 12.5 | 2.0 | 43 |
| 75 | 34.7 | 19.6 | 12.5 | 2.0 | 44 |
| 76 | 34.7 | 20.2 | 12.5 | 2.0 | 44 |
| 77 | 34.7 | 20.8 | 12.5 | 2.0 | 45 |
| 78 | 34.7 | 21.5 | 12.5 | 2.0 | 46 |
| 79 | 34.7 | 22.2 | 12.5 | 2.0 | 46 |
| 80 | 34.7 | 22.9 | 12.5 | 2.0 | 47 |
| 81 | 34.7 | 23.8 | 12.5 | 2.0 | 48 |
| 82 | 34.7 | 24.6 | 12.5 | 2.0 | 49 |
| 83 | 34.7 | 25.6 | 12.5 | 2.0 | 50 |
| 84 | 34.7 | 26.6 | 12.5 | 2.0 | 51 |
| 85 | 34.7 | 27.7 | 12.5 | 2.0 | 52 |

FOUR SHEETS/s (600mm/s)

| VELOCITY (SHEETS/s) | 68mm | 77mm |
|---|---|---|
| 4 | 1.28 | 1 |

a = -0.03111 b = 3.395556

VELOCITY AT WHICH MEDIUM FLIES = a X SIZE OF MEDIUM + b

= -0.03111 X SIZE OF MEDIUM + 3.395556

METHOD OF STACKING MEDIA IN MEDIA STORAGE UNIT

BACKGROUND

1. Field of the Invention

The present invention relates to a method of stacking media in a media storage unit, and more specifically, to a method of stacking media in a media storage unit that may stably accumulate media of multiple denominations of various media sizes.

2. Discussion of Related Art

Generally, an automated teller machine (ATM) is equipped with a media storage unit in which media, such as checks and banknotes, are stored for processing. Media of multiple denominations may be stored in the media storage unit.

The conventional media storage unit is provided with a front plate at a media entry side to guide accumulation of media, a stopper on the front plate to press an entering medium toward a media accumulation space, and a medium detection sensor at the media entry side of the media storage unit to detect whether a rear end of a medium has been passed.

After a constant delay time after it is detected by the medium detection sensor that a rear end of a medium has passed, the stopper is rotationally driven to press the medium that has entered the media accumulation space toward a medium previously loaded in the media accumulation space to temporarily hold the entering medium, and the medium held by the stopper as described above is struck at a rear end portion by a stack sheet while rotating, causing the medium to be stacked in the media accumulation space.

Media accumulated in the media storage unit have varying sizes and weights depending on the denomination of the media, resulting in a difference in linear velocities at which the media enter the media accumulation space, and a friction force generated between an entering medium and a previously accumulated medium also depends on the sizes of the media.

However, in the conventional media storage unit, the delay time to drive the stopper is set to a constant time value, and thus the stopper is configured to operate after a constant delay time has elapsed regardless of the size of the medium, resulting in stack misalignment of media of multiple denominations.

The related art of a media storage unit of an automated teller machine is disclosed in Korean Registered Patent No. 10-1628481.

SUMMARY OF THE INVENTION

The present invention is directed to providing a method of stacking media in a media storage unit that may stably accumulate media of multiple denominations with differences in entry linear velocities due to varying sizes of the media.

According to an aspect of the present invention, there is provided a method of stacking media in a media storage unit, the method comprising: receiving information about a length of a medium entering a media storage unit; calculating a delay time of a stopper corresponding to the length of the medium; and applying a delay time of the stopper calculated for each medium entering the media storage unit to differentially control activation of the stopper for each medium.

Wherein the delay time of the stopper is calculated as a time value obtained by subtracting an operation time of the stopper from a sum of a time for the medium to move in engagement with a feed roller and a guide roller provided at an entry side of the media storage unit, a time for the medium to fly away from the feed roller and the guide roller, and a time for which movement of the medium is delayed due to friction with a preceding medium previously loaded in the medium storage space.

Wherein the time for the medium to fly away from the feed roller and the guide roller is calculated differentially for each medium based on experiment result data obtained according to the lengths and conveyance velocities of the media.

Wherein the time for the medium to fly away from the feed roller and the guide roller is calculated using a linear equation obtained based on the experiment result data, assuming that the time for the medium to fly away from the feed roller and the guide roller is linearly proportional to the length of the medium.

Wherein, to calculate the delay time of the stopper, experimentally obtained constant values are employed for each of the time for the medium to move in engagement with the feed roller and the guide roller, the time for which movement of the medium is delayed due to friction with the preceding medium previously loaded in the medium storage space, and the operation time of the stopper, and a value calculated differentially for each medium is employed for the time for the medium to fly away from the feed roller and the guide roller.

Wherein the information about the length of the medium entering the media storage unit is obtained using denomination information of media acquired from a discrimination unit provided in an automated teller machine.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a view illustrating a stopper of a media storage unit according to the present invention, arranged in a home position;

FIG. 2 is a view illustrating the stopper of the media storage unit according to the present invention which is rotated forward toward an entering medium;

FIG. 3 is a perspective view illustrating a front plate, a stopper, and a stopper driving unit provided in the media storage unit according to the present invention;

FIG. 4 is a rear perspective view of FIG. 3;

FIG. 5 is a control block diagram of the media storage unit according to the present invention;

FIG. 6 is a flowchart showing a method of stacking media in a media storage unit according to the present invention; and FIGS. 7 to 10 are tables illustrating experiment data for calculating a delay time of a stopper under various conditions with different sizes and conveyance velocities of media.

DESCRIPTION OF REFERENCE NUMERALS

| | |
|---|---|
| 100: media storage unit | 110: media accumulation unit |
| 111: feed roller | 112: guide roller |
| 113: stack sheet | 120: front plate |
| 121: front plate rotation shaft | 122: damper |
| 123: locking unit | 130: push plate |
| 140: guide unit | 150: stopper |
| 151: stopper rotation shaft | 152: stopper body |
| 153: stopper rib | 160: stopper driving unit |
| 161: motor | 162: first pulley |
| 163: first belt | 164: second pulley |
| 165: third pulley | 166: second belt |
| 167: fourth pulley | 170: medium detection sensor |
| 180: control unit | 200: discrimination unit |
| P, P1, P2: media | S: media accumulation space |

DETAILED DESCRIPTION OF EXEMPLARY EMBODIMENTS

Hereinafter, the configuration and operations of exemplary embodiments of the present invention will be described in detail with reference to the accompanying drawings.

The configuration of a media storage unit 100 to which the present invention is applied will be described with reference to FIG. 1.

The media storage unit 100 includes a media accumulation unit 110 including a feed roller 111 and a guide roller 112 that are connected to a conveyance path and sandwich and transport media and a stack sheet 113 striking a rear end of a medium that has entered a media accumulation space S toward the media accumulation space S, a front plate 120 provided at an upper side of the media accumulation space S to guide the medium that has passed through the media accumulation unit 110 into the media accumulation space S, a push plate 130 that supports the medium introduced into the media accumulation space S and moves back and forth, a guide unit 140 that supports a lower end of the medium introduced into the media accumulation space S, a stopper 150 rotatably provided on an upper side of the front plate 120 to press an entering medium toward the media accumulation space S, a stopper driving unit 160 for rotating the stopper 150, and a medium detection sensor 170 provided on an entry side of the media storage unit 100 to detect a rear end of a medium passing through the entry side.

FIG. 1 is a view illustrating the stopper 150 arranged in a home position, and FIG. 2 is a view illustrating the stopper 150 which is rotated toward an entering medium.

The home position shown in FIG. 1 is a state in which, while the front plate 120 is rotated counterclockwise by a predetermined angle about a front plate rotation shaft 121 at a lower side of the front plate 120 and thus tilted toward the media accumulation space S, the stopper 150 is rotated rearward, and media P loaded in the media accumulation space S are supported by a damper 122 provided on an upper side of the front plate 120. The damper 122 is provided on an upper side of the front plate 120 to apply an elastic force forward with an elastic member (not shown), and thus a leading edge of a medium entering the media accumulation space S makes contact with the damper 122, absorbs shock upon contact, and thereby reduces the entry speed of the medium and serving as a buffer.

FIG. 2 is a state in which, while the front plate 120 is rotated counterclockwise by a predetermined angle about the front plate rotation shaft 121 at the lower side thereof of the front plate 120 and thus tilted toward the media accumulation space S, the stopper 150 is rotated forward to press a succeeding medium P2, which has entered the media accumulation space S, toward a preceding medium P1, which is previously loaded, to temporarily hold the succeeding medium P2. In this state, the stack sheet 113 is rotated to strike the rear end of the succeeding medium P2 toward the media accumulation space S, allowing the succeeding medium P2 to be accumulated on one side of the preceding medium P1.

Hereinafter, the configuration of the front plate 120, the stopper 150, and the stopper driving unit 160 will be described with reference to FIGS. 3 and 4.

The front plate 120 serves to guide change of the entry path of the medium passing through the media accumulation unit 110 to a side of the media accumulation space S. A front plate rotation shaft coupling unit 121*a* into which the front plate rotation shaft 121 is inserted and coupled is provided at a lower end of the front plate 120, and a stopper rotation shaft coupling unit 151*a* into which a stopper rotation shaft 151 is inserted and coupled is provided at an upper side. A damper 122 formed by a portion of the front plate 120 protruding forward is provided on an upper side of the front plate 120, and on both sides of the damper 122, locking units 123 that are locked with a stopper rib 153 of the stopper 150, which will be described below, when the stopper rib 153 is rotated rearward are provided.

The stopper 150 includes a stopper rotation shaft 151, a stopper body 152 coupled to the stopper rotation shaft 151, and a plurality of stopper ribs 153 extending from the stopper body 152 to press a medium.

The stopper driving unit 160 includes a motor 161, a first pulley 162 coupled to the shaft of the motor 161, a first belt 163 with one side connected to the first pulley 162, a second pulley 164 connected to the other side of the first belt 163 and coupled to the front plate rotation shaft 121, a third pulley 165 coupled to the front plate rotation shaft 121 on one side of the second pulley 164, a second belt 166 with one side connected to the third pulley 165, and a fourth pulley 167 connected to the other side of the second belt 166 and coupled to the stopper rotation shaft 151. The second pulley 164 and the third pulley 165 are each coupled to the front plate rotation shaft 121 via bearings, and the fourth pulley 167 is directly coupled to the stopper rotation shaft 151.

Referring to FIG. 5, denomination information of media acquired from a discrimination unit 200 provided in an automated teller machine may be used as information about the length of a medium entering the media storage unit 100.

Length information of the medium received from the discrimination unit 200 and a rear end passage detection signal of the medium detected by the medium detection sensor 170 are transmitted to a control unit 180, and the control unit 180 controls the stopper driving unit 160 to vary a driving start time of the stopper 150 for each medium according to a delay time of the stopper 150 that is calculated to correspond to the length of the medium based on the received information.

Hereinafter, a method of stacking media in a media storage unit according to the present invention will be described with reference to FIG. 6.

The method of stacking media in the media storage unit according to the present invention includes receiving length information of a medium P2 entering the media storage unit 100 (S1), calculating a delay time of the stopper 150 corresponding to the length of the medium P1 (S2), and applying a delay time of the stopper 150 calculated for each medium entering the media storage unit 100 to differentially control activation of the stopper 150 for each medium (S3).

FIGS. 7 to 10 illustrate experiment data for calculating a delay time of the stopper 150 under various conditions with different sizes (lengths) and conveyance velocities of media.

FIG. 7 illustrates experiment data for calculating a delay time of the stopper 150 when conveying ten sheets of media at 1,500 mm/s, and a linear equation for calculating the velocity, at which bills fly, using the experiment data, FIG. 8 illustrates experiment data for calculating a delay time of the stopper 150 when conveying eight sheets of media at 1,200 mm/s, and a linear equation for calculating the velocity at which bills fly using the experiment data, FIG. 9 illustrates experiment data for calculating a delay time of the stopper 150 when conveying six sheets of media at 900 mm/s, and a linear equation for calculating the velocity at which bills fly using the experiment data, and FIG. 10 illustrates experiment data for calculating a delay time of the stopper 150 when conveying four sheets of media at 600 mm/s, and a linear equation for calculating the velocity at which bills fly using the experiment data, The delay time of the stopper 150 is defined a period from a point in time when the rear end of a medium entering the media storage unit 100 is detected by the medium detection sensor 170 provided on the entry side of the media storage unit 100 to a point in time when an operation of the stopper 150 starts.

Experiment data is calculated by measurement for a period during a period from a point in time when the rear end of the medium is detected by the medium detection sensor 170 provided on the entry side of the media storage unit 100 to a point in time when the operation of the stopper 150 is completed.

In this case, the delay time of the stopper 150 is calculated as a time value (T1+T2+T3-T4) obtained by subtracting an operation time T4 of the stopper 155 from the sum of a time T1 for the medium P2 to move in engagement with the feed roller 111 and the guide roller 112 provided on the entry side of the media storage unit 100, a time T2 for the medium P to fly away from the feed roller 111 and the guide roller 112, and a time T3 for which movement of the medium P2 is delayed due to friction with a preceding medium P1 previously loaded in the medium storage space S.

A value set to 2 ms based on a delay time of 10 ms for a medium size of 154×68 mm is employed as the time T3 for which movement of the medium P2 is delayed due to friction with the preceding medium P1 previously loaded in the medium storage space S.

The time T2 for the medium P1 to fly away from the feed roller 111 and the guide roller 112 may be differentially calculated for each medium based on the experiment data obtained according to the length and the conveyance velocity of the medium P1.

In this case, the time for the medium P2 to fly away from the feed roller 111 and the guide roller 112 is calculated using a linear equation obtained based on the experiment result data, assuming that the time is linearly proportional to the length of the medium P2.

For example, referring to FIG. 7, when ten sheets of media are conveyed at 1,500 mm/s, the time for the media P2 to fly away from the feed roller 111 and the guide roller 112 may be determined from the velocity calculated from the linear equation on the velocities at which the media fly, and the moving distances of the media.

Since the velocities at which the media fly vary depending on the sizes and weights of the media, it is difficult to measure the velocities for all media, and thus the delay time of a medium of 77 mm (100 yuan, 155×77) was empirically measured, assuming that the velocity is subject to linear change.

In addition, when calculating the delay time of the stopper 150, experimentally obtained constant values may be employed for each of the time for the medium P1 to move in engagement with the feed roller 111 and the guide roller 112, the time for which movement of the medium P1 is delayed due to friction with the preceding medium P previously loaded in the medium storage space S, and the operation time of the stopper 150, and a value calculated differentially for each medium may be employed for the time for the medium to fly away from the feed roller 111 and the guide roller 112.

As described above, with the method of stacking media in the media storage unit according to the present invention, the delay time of the stopper 150 calculated for each medium entering the media storage unit 100 is applied to differentially control activation of the stopper 150 for each medium, thereby stably accumulating media of multiple denominations with a difference in linear velocities at which the media enter the media storage unit 100 and thus improving the media stacking performance.

Although exemplary embodiments of the present invention have been described for illustrative purposes, those skilled in the art will appreciate that various modifications, variations, and additions are possible without departing from the scope and spirit of the present invention, and thus these various modifications, variations, and additions fall within the scope of the claims.

What is claimed is:

1. A method of stacking media in a media storage unit, the method comprising:

receiving information about a length of a medium entering a media storage unit;

calculating a delay time of a stopper corresponding to the length of the medium; and applying a delay time of the stopper calculated for each medium entering the media storage unit to differentially control activation of the stopper for each medium, wherein the delay time of the stopper is calculated as a time value obtained by subtracting an operation time of the stopper from a sum of a time for the medium to move in engagement with a feed roller and a guide roller provided at an entry side of the media storage unit, a time for the medium to fly away from the feed roller and the guide roller, and a time for which movement of the medium is delayed due to friction with a preceding medium previously loaded in the medium storage space.

2. The method of claim 1, wherein the time for the medium to fly away from the feed roller and the guide roller is calculated differentially for each medium based on experiment result data obtained according to the lengths and conveyance velocities of the media.

3. The method of claim 1, wherein the time for the medium to fly away from the feed roller and the guide roller is calculated using a linear equation obtained based on the experiment result data, assuming that the time for the medium to fly away from the feed roller and the guide roller is linearly proportional to the length of the medium.

4. The method of claim 1, wherein, to calculate the delay time of the stopper, experimentally obtained constant values are employed for each of the time for the medium to move in engagement with the feed roller and the guide roller, the time for which movement of the medium is delayed due to friction with the preceding medium previously loaded in the medium storage space, and the operation time of the stopper, and a value calculated differentially for each medium is employed for the time for the medium to fly away from the feed roller and the guide roller.

5. The method of claim 1, wherein the information about the length of the medium entering the media storage unit is obtained using denomination information of media acquired from a discrimination unit provided in an automated teller machine.

* * * * *